United States Patent
Rocamora et al.

(10) Patent No.: US 8,232,666 B2
(45) Date of Patent: *Jul. 31, 2012

(54) EXTERNAL AC-DC COUPLING FOR COMMUNICATION INTERFACES

(75) Inventors: David Gimenez Rocamora, Barcelona (ES); Jonathan Ephraim David Hurwitz, Edinburgh (GB)

(73) Assignee: Broadcom Europe Limited, London (GB)

(*) Notice: Subject to any disclaimer, the term of this patent is extended or adjusted under 35 U.S.C. 154(b) by 41 days.

This patent is subject to a terminal disclaimer.

(21) Appl. No.: 12/705,182

(22) Filed: Feb. 12, 2010

(65) Prior Publication Data
US 2010/0246648 A1   Sep. 30, 2010

Related U.S. Application Data

(60) Provisional application No. 61/152,229, filed on Feb. 12, 2009.

(51) Int. Cl.
*H02J 1/00* (2006.01)
(52) U.S. Cl. .................... 307/1; 307/DIG. 1
(58) Field of Classification Search .............. 375/222; 307/1, 2, 3, 4, DIG. 1
See application file for complete search history.

(56) References Cited

U.S. PATENT DOCUMENTS

| | | | |
|---|---|---|---|
| 4,685,129 A | 8/1987 | Gavrilovich | |
| 5,770,996 A | 6/1998 | Severson et al. | |
| 6,985,714 B2 | 1/2006 | Akiyama et al. | |
| 7,394,204 B1 | 7/2008 | Shet et al. | |
| 7,660,345 B2 * | 2/2010 | Yu | 375/222 |
| 2006/0218422 A1 * | 9/2006 | Camagna et al. | 713/300 |
| 2007/0152628 A1 | 7/2007 | Lee | |
| 2007/0230377 A1 * | 10/2007 | Nosaka et al. | 370/294 |
| 2008/0316004 A1 * | 12/2008 | Kiko | 340/310.13 |
| 2009/0284227 A1 * | 11/2009 | Mohammadian et al. | 320/137 |

OTHER PUBLICATIONS

International Search Report: PCT/US2010/024125 dated Apr. 15, 2010.

* cited by examiner

*Primary Examiner* — Daniel Cavallari
(74) *Attorney, Agent, or Firm* — Garlick & Markison

(57) ABSTRACT

A power line communication device comprises a plurality of transformers in series. These transformers are used to increase the voltage of a digitally encoded signal in a stepwise fashion prior to being coupled into a power line. While a transmit path includes at least a first transformer and a second transformer in series, a receive path may include only one of these two transformers. For example a receive path may include only the first transformer, or include the first transformer and a third transformer. The net ratio of voltage increase and decrease may be different in the transmit and receive paths. Additionally, the communication interface can be disposed within an AC/DC converter or distributed among an AC/DC converter and an appliance attached thereto.

16 Claims, 10 Drawing Sheets

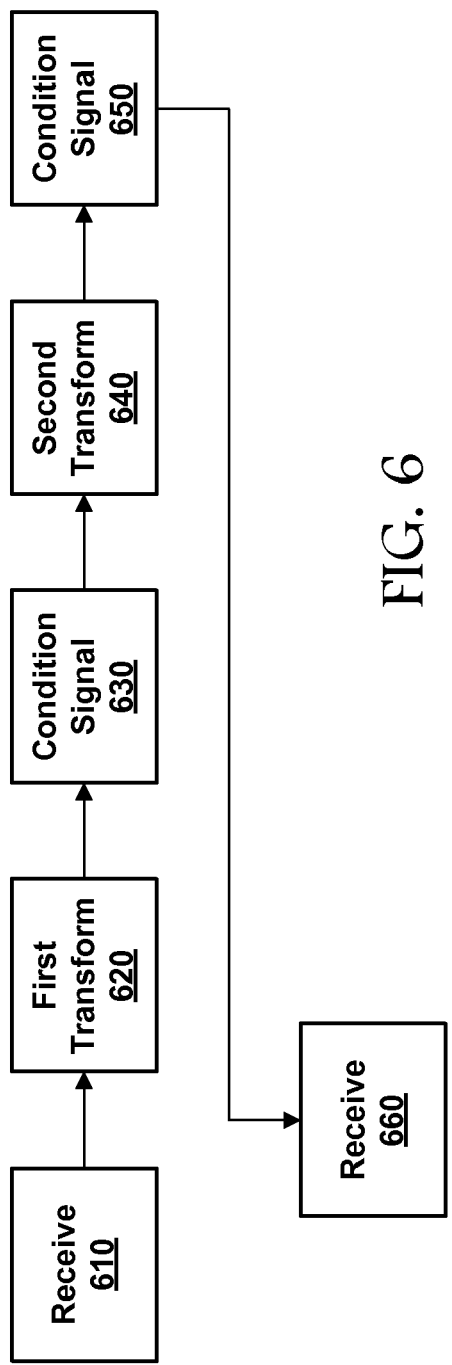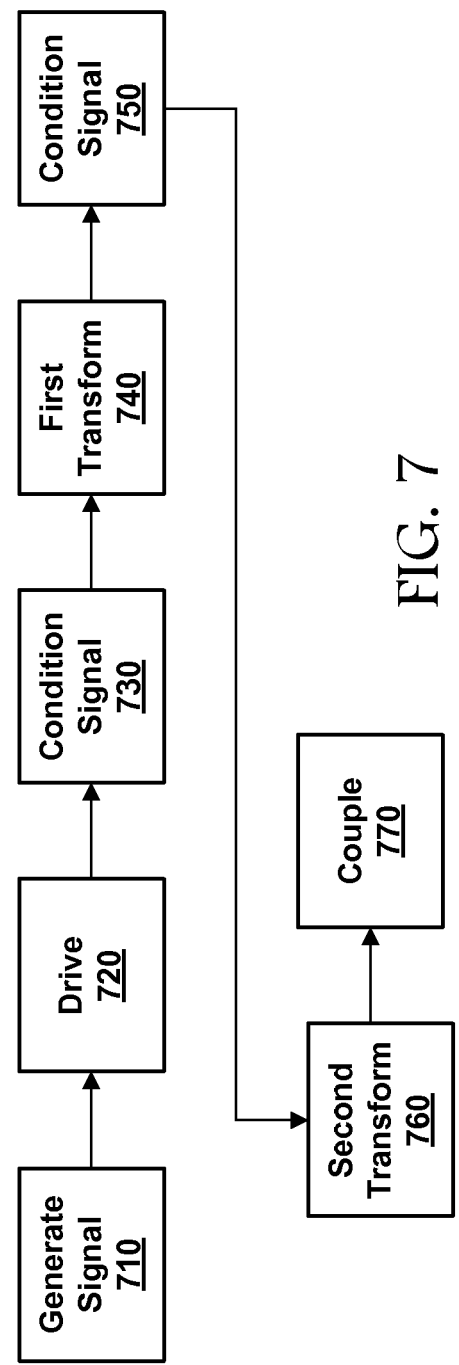

EXTERNAL AC-DC COUPLING FOR COMMUNICATION INTERFACES

CROSS-REFERENCE TO RELATED APPLICATIONS

This application claims the benefit of U.S. Provisional Patent Application No. 61/152,229 filed Feb. 12, 2009 and entitled "External AC-DC Coupling for Communication Interfaces," which is incorporated herein by reference. This application is related to: U.S. patent application Ser. No. 12/144,511 filed Jun. 23, 2008 and entitled "Dual Transformer Communication Interface;" U.S. patent application Ser. No. 12/075,888 filed Mar. 14, 2008 and entitled "Coupling Signal Processing Circuitry with a Wireline Communications Medium;" U.S. patent application Ser. No. 11/467,141 filed Aug. 24, 2006 and entitled "Multi-Wideband Communications over Power Lines;" U.S. patent application Ser. No. 11/536,539 filed Sep. 28, 2006 and entitled "Multi-Wideband Communications over Power Lines;" U.S. patent application Ser. No. 11/752,887 filed May 23, 2007 and entitled "Multi-Wideband Communications over Multiple Mediums;" U.S. patent application Ser. No. 11/752,865 filed May 23, 2007 and entitled "Multi-Wideband Communications over Multiple Mediums within a Network;" U.S. patent application Ser. No. 11/493,292 filed Jul. 25, 2006 and entitled "Feedback Impedance Control for Driving a Signal;" and U.S. patent application Ser. No. 11/855,081 filed Sep. 13, 2007 and entitled "Improved Wireline Transmission Circuit." The above related patent applications are hereby incorporated herein by reference in their entirety.

BACKGROUND

1. Field of the Invention

The invention is in the field of communications over power lines or the like.

2. Related Art

Communication of data via power lines includes the coupling of data encoded signals into and from the power lines. For various reasons, these data encoded signals are preferably on the order of 15 Volts (peak-to-peak) to achieve the maximum allowable Power Spectral Density (PSD) over the spectrum allowed by various standards and regulations. One approach to generating these 15 Volt signals includes using an amplifier to increase the signal from say approximately 2 Volts (peak-to-peak) to 15. This amplifier adds to the cost of a system because it requires an additional high voltage power supply sufficient to achieve the 15 Volts and is typically implemented on a separate silicon device, relative to the circuits used to generate the original signals, because of its higher voltage requirements. The 15 Volt signals are then coupled to a power line via a single low ratio isolation transformer.

In another approach, signals on the order of 15 Volts can be generated from signals on the order of 4 Volts peak-peak by using a single transformer with a high (e.g., 1:4) ratio of primary to secondary coils. This approach has the advantage that this same transformer may be used as an isolation transformer to couple the signals into the power line. This can result in significant savings. However, this approach presents several problems. For example, for a 1:4 (P:S) transformer the impedance seen before the transformer is $1/16^{th}$ of the impedance seen after the transformer. This may result in impedance before the transformer that is difficult to drive. This low impedance also places requirements on any signal conditioning components between the signal source and the transformer. These requirements result in a greater component cost. Further, quality factors and parasitics associated with the windings and core of the transformer can limit the width of the frequency range over which the transformer will perform without loss in the resulting signal. As a result, if a wide frequency range is required with relatively high injected power capability, then very expensive or even impossible transformers may be needed.

Signal conditioning components are sometimes used to shape the frequency response of the driving signal, or to combine it with another signal in a different frequency band. It is important for optimum performance that these signal conditioning components are approximately the same impedance as the impedances driving and being driven by them to achieve maximum power efficiency. This can be difficult. There are many other signal conditioning functions, such as surge protection, impedance matching, and switching, that are not just passive but active, which require low loss components, this is more difficult to achieve if a low impedance is present due to a single high ratio transformer.

SUMMARY

Various embodiments include the use of two transformers in series, each having a winding ratio greater than one, to convert a lower voltage signal to higher voltages. These two transformers are disposed in a transmission signal path between a signal source and a power line connector. One or both of the two transformers are optionally included in both signal transmit and signal receive pathways.

Some embodiments of the invention enable different ratios of voltage step up and voltage step down for the transmit and receive pathways, respectively. This may allow for better control of signal to noise ratios and/or a greater dynamic range for each pathway. For example, some embodiments of the invention enable signal conditioning circuitry anywhere along the transmit pathway, to protect the circuitry from overload conditions and/or to provide frequency shaping to the transmitted signal. Further, by using two transformer primary to secondary ratios on the order of ~1:2 (Primary:Secondary), an approximately 4.4V differential output peak-peak signal from 3.3V powered CMOS circuitry may be increased to approximately 15 Volts peak-peak signal, while allowing for some (~15%) losses in the signal conditioning circuitry in the transmit pathway. These 15V signals are then coupled to a power line for transmission to other devices. By using more than one transformer with winding ratios on the order of 1:2 instead of a single transformer with higher winding ratio, less expensive and higher bandwidth devices may be used in the transmission signal path, and the losses in the signal conditioning circuitry may be better controlled with lower cost components.

Various embodiments of the invention include a system comprising: a first signal source configured to generate a first data encoded signal; a first transformer configured to receive the first data encoded signal at a primary winding, and having a primary to secondary winding ratio that is greater than one; and a second transformer in series with the first transformer, configured to receive an output of the first transformer at a primary winding of the second transformer, configured to provide an output signal including the first data to an alternating current power line, and having a primary to secondary winding that is greater than one.

Various embodiments of the invention include a system comprising: a transmit path between a signal source and a power line, the transmit path comprising at least a first transformer and a second transformer in series; and a receive path between the power line and a signal receiver, the receive path comprising at least the second transformer but not the first transformer, the signal source and signal receiver being included in the same communication interface.

Various embodiments of the invention include a method of communicating a signal, the method comprising: generating a first digitally encoded signal; passing the first digitally encoded signal through a first transformer; passing the first digitally encoded signal through a second transformer in series with the first transformer; and coupling the first digitally encoded signal into an AC power line.

Various embodiments of the invention include a method of communicating a signal, the method comprising: receiving a first digitally encoded signal from an AC power line; passing the first digitally encoded signal through a first transformer; conditioning the first digitally encoded signal to separate required frequencies of the first digital encoding signal from other frequencies; optionally passing the first digitally encoded signal through a second transformer in series with the first transformer; and decoding the first digitally encoded signal.

Various embodiments of the invention comprise an appliance, an AC/DC converter, and cabling. The appliance includes a modem configured to send and receive digitally encoded signals and can comprise a portable electronic device in some embodiments. The AC/DC converter is disposed external to the appliance. The AC/DC converter includes an AC to DC module configured to convert AC line voltage of a power line to one or more DC voltages, and signal coupling circuitry comprising a transformer configured to receive the digitally encoded signals from the appliance and to couple the digitally encoded signals into and out of the power line. The cabling includes one or more first conductors configured to convey the one or more DC voltages between the AC/DC converter and the appliance, and one or more second conductors configured to convey the digitally encoded signals between the appliance and the AC/DC converter. The cabling, in some embodiments is integral to the appliance and/or AC/DC converter, while in some embodiments the cabling is external to, and detachable from, the appliance and/or AC/DC converter.

The signal coupling circuitry can further comprise, in various embodiments, any or all of an over-voltage protection device, a coupling capacitor, and a signal conditioner in electrical communication. The signal coupling circuitry may comprise a pair of transformers in parallel electrical communication between the power line and a common ground.

The system may further comprise a filter, such as a capacitor, in electrical communication between the AC to DC module and the power line and configured to protect the signal coupling circuitry from noise produced by the AC to DC module. The system may also further comprise a zero crossing circuitry configured to generate a timing signal from the AC line voltage. Some of these embodiments comprise one or more third conductors configured to convey the timing signal to the appliance.

Various embodiments of the invention comprise an AC/DC converter and cabling. Here, the AC/DC converter includes means for converting AC line voltage of a power line to one or more DC voltages, and means for receiving digitally encoded signals and coupling the digitally encoded signals into and/or out of the power line. The cabling includes one or more first conductors configured to convey the one or more DC voltages between the AC/DC converter and an appliance, and one or more second conductors configured to convey the digitally encoded signals between the appliance and the AC/DC converter. The system can further comprise an appliance, in some embodiments. In some of these embodiments, the appliance includes a modem configured to send and receive the digitally encoded signals. The system can also comprise means for generating a timing signal from the AC line voltage, in some instances.

Various embodiments of the invention comprise a method for receiving a digitally encoded signal. An exemplary method comprises receiving a digitally encoded signal from a power line by signal coupling circuitry of an AC/DC converter, separating the digitally encoded signal from the AC power signal, optionally transforming the digitally encoded signal to a lower peak-to-peak voltage using the signal coupling circuitry, and receiving the transformed digitally encoded signal by an appliance in electrical communication with the AC/DC converter.

Various embodiments of the invention comprise a method for transmitting a digitally encoded signal. An exemplary method comprises generating a digitally encoded signal by an appliance, transforming the digitally encoded signal using a first transformer, transforming the digitally encoded signal again using a second transformer, the second transformer being disposed within an AC/DC converter, and coupling the digitally encoded signal into a power line from the AC/DC converter. In some embodiments, the first transformer is a component of the appliance.

BRIEF DESCRIPTION OF THE DRAWINGS

FIG. 6 illustrates methods of receiving a digitally encoded signal, according to various embodiments of the invention.

FIG. 7 illustrates methods of transmitting a digitally encoded signal, according to various embodiments of the invention.

DETAILED DESCRIPTION

Figure 1:
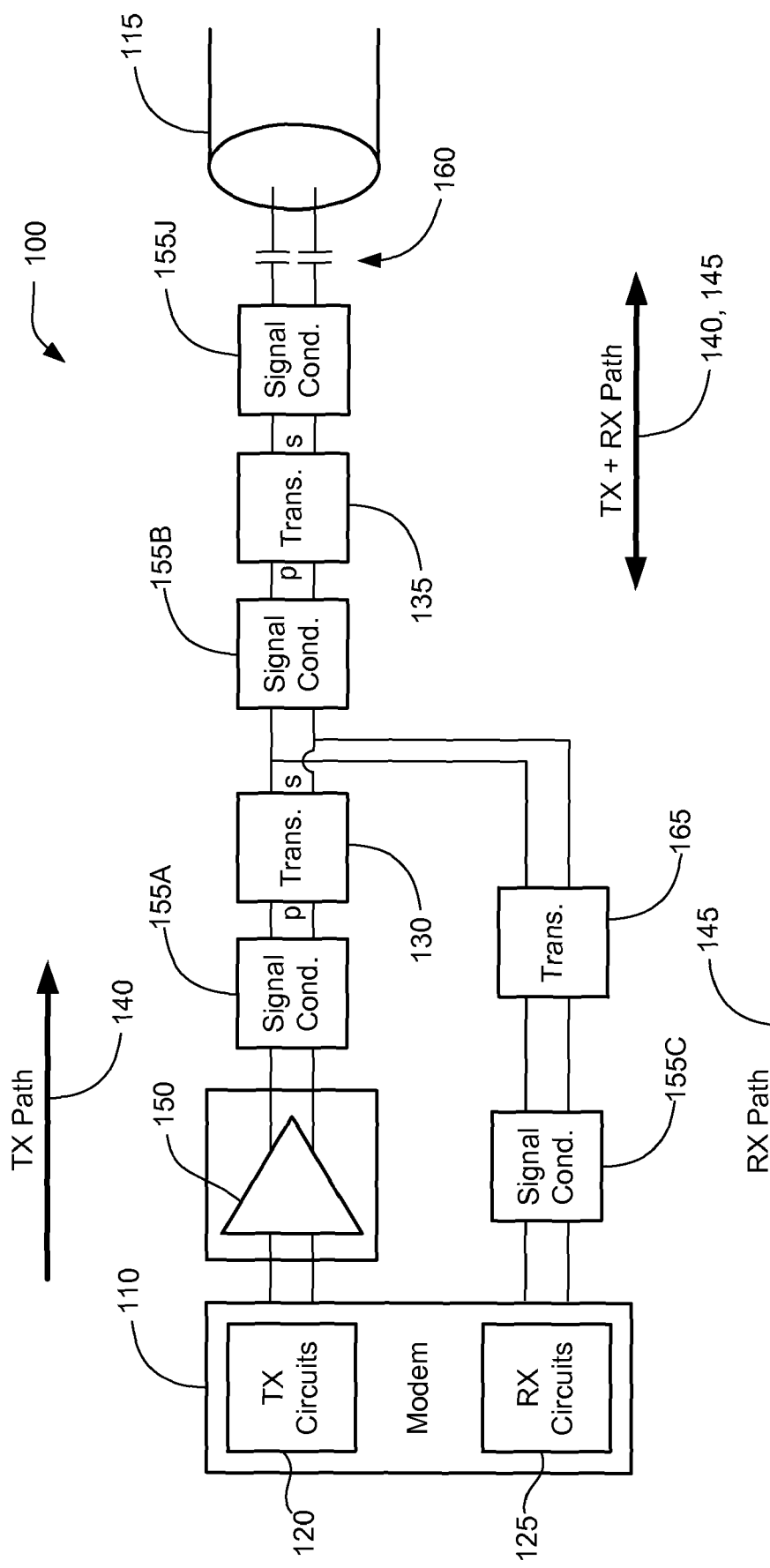
FIG. 1 illustrates a communication interface comprising two transformers in series, according to various embodiments of the invention.

In power line communications digitally encoded signals are passed through an AC (alternating current) power line.

The same power line can be used to both power an electronic system and to communicate between the electronic system and other devices. Digitally Encoded signals are analog or digital signals from which digital data can be derived. For example, the digitally encoded signals may include video data, audio data, TCP/IP data, Ethernet data, or any other data type. The digitally encoded signals are transmitted from and received by low voltage circuits that have both digital and analog sections. These circuits are typically developed on small geometry CMOS, BiCMOS, or similar technologies and have a limited range of allowable supply voltages for the digital and analog sections of the technology. For example, digital sections of a communication system may be powered by 0.8V, 0.9V, 1V, 1.2V, 1.8V, 2.5V, 2.8V, 3.3V or 5V power supplies, amongst others. Analog and input/output (IO) sections of the communication system may be powered using different voltages. For example the digital sections may operate from a 1V power supply while the analog circuits may operate from a 1.2V, 1.8V, 2.5V, 2.8V, 3.3V or 5V power supply, amongst others.

Some examples discussed herein assume that the output of the low voltage circuits (e.g., a signal source) is based on CMOS circuits and thus the signal is driven from a power supply (VDD) in the range of 1.8V to 5V, and, thus, in these examples it is only practically possible to output directly a differential linear signal considerably less than 2*VDD peak-to-peak. (E.g., from a 3.3V supply it may only be possible to design circuitry that can create a linear signal with approximately 4.4V peak-to-peak.) However it is to be understood that other technologies, with other power supply voltages, and other linear output signal voltages may be included in the low voltage circuits in alternative embodiments.

The digitally encoded output of the low voltage circuits is passed through a transmit path that includes coupling circuitry prior to introduction into a power line. This coupling circuitry comprises a plurality of transformers in series and configured to increase the voltage of these signals. For example, a 4.4V signal, generated using a signal source, can be ideally stepped up to 17.6 Volts using two transformers each having a winding ratio of 1:2. The combined impact of these transformers is to increase the voltage by 2×2=4 times. In various embodiments, the voltage of the signals introduced into the power line are ~4 volts, ~6 volts, ~8 volts ~10 volts, ~12 volts, ~14 volts, ~16 volts, ~18 volts, ~20 volts, or between any combinations of these voltages. The maximum peak-to-peak voltage of the digitally encoded signal injected into the power line may be a function of industry standards, the regulatory requirements, a specific application, the implementation, and/or the like. For example, the industry standard Homeplug AV 1.1 allows a maximum Power Spectral Density (PSD) of −50 dBm/Hz in the band between 1.8 MHz and 30 MHz. In a given country regulatory bodies may only allow a lower injected power, a customer may request an even lower PSD for their own application reasons, such as power consumption or other product considerations. The final peak to-peak voltage may depend on the implementation of the modem. For example, the Peak-to-Average ratio of an OFDM (orthogonal frequency division multiplexing) symbol may be restricted by clipping, to affect a valid range of equivalent peak-peak signals on the line.

Digitally encoded signals received from the power line are passed through a receive path. The receive path may include one or both of the transformers that are included in the transmit path. For example, in some embodiments, the receive path includes the same transformers as the transmit path. In these embodiments, the peak-to-peak voltages of incoming signals are optionally reduced by the same ratio as the transmitted signals are increased. For example, if the voltages of the transmitted signals are increased by four times then the received signals may be reduced by four times. In other embodiments the receive path includes one but not both of the transformers included in the transmit path. For example, if the transmit path includes two transformers with winding ratios of 1:2 and the receive path includes the second but not the first of these two transformers, then the peak-to-peak voltage of the received signals are reduced by approximately a factor of 2. In some embodiments a transformer included in both the transmit path and the receive path is a multi-tap transformer and, thus, the winding ratio experienced along the transmit and receive paths at this transformer may be different.

FIG. 1 illustrates a Communication Interface 100 comprising two transformers in series, according to various embodiments of the invention. Communication Interface 100 is disposed between a Power Line Modem 110 and a Power Line 115 and is configured to couple digitally encoded signals between these devices. Power Line Modem 110 typically comprises TX (transmit) Circuits 120 and RX (receive) Circuits 125. TX Circuits 120 are an example of a signal source. In some embodiments, TX Circuits 120 and RX Circuits 125 include CMOS circuits configured to generate and receive signals using a 3.3V DC power supply (VDD). In some embodiments the TX Circuits 120 generate a 2V peak-to-peak differential signal, in some embodiments the TX Circuits 120 generate a smaller or a larger signal according to their abilities.

Communication Interface 100 optionally further comprises a low voltage Line Driver 150. Line Driver 150 is typically a buffer, a transimpedance stage or a low gain (e.g. <4× or <2×) amplifier that is configured to supply sufficient voltage and current to propagate signals into other elements of Communication Interface 100. Line Driver 150 is optionally disposed on the same semiconductor substrate as TX Circuits 120. Line Driver 150 is optionally integrated into the TX Circuits 120. Line Driver 150 is optionally powered by the same supply voltage as TX Circuits 120. For example, both TX Circuits 120 and Line Driver 150 may be powered using the same 3.3V, 5V or the like. Power Line 115 is configured to convey power. For example, Power Line 115 may include a 110 to 240V AC signal at 50 to 60 Hz. Electrical power from Power Line 115 is optionally used to power Power Line Modem 110 using circuits not shown. As used herein, the term "power line" is used as defined in U.S. patent application Ser. No. 11/467,141 with the further restriction that the term additionally excludes coaxial cables and Ethernet cables.

Communication Interface 100 includes at least a Transformer 130 and a Transformer 135. Transformer 130 is disposed within a TX (transmit) Path 140 but optionally not a RX (receive) Path 145. Transformer 135 is in series with Transformer 130 with respect to the TX Path 140, and is optionally also included in RX Path 145. Transformer 130 and Transformer 135 each have a primary to secondary winding ratio greater than one, e.g., less than or equal to 1:1.66 or 1:2 or 1:2.1. For example, in typical embodiments, Transformer 130 and Transformer 135 include winding ratios between approximately 1:1.5 and 1:4. In some embodiments, Transformer 130 and Transformer 135 include winding ratios between approximately 1:1.66 and 1:2.5. The winding ratios of Transformer 130 and Transformer 135 are optionally different. For example, in one embodiment Transformer 130 is characterized by a winding ratio of 1:2.25 while Transformer 135 is characterized by a winding ratio of 1:2. The winding ratios of Transformer 130 and Transformer 135 are optionally selected such that a signal generated by TX Circuits 120 is at least 4V peak-to-peak after passing through Transformer 135. For example, in various embodiments, the resulting output of Transformer 135 is between 4V and 6V, between 6V and 8V, between 8V and 10V, between 10V and 12V, between 12V and 14V, between 14V and 16V, between 16V and 18V, between 18V and 20V, or is configurable between 4V and 20V, peak-to-peak.

Communication Interface 100 optionally further includes one or more Signal Conditioners 155, individually labeled 155A ... 155J, etc. Signal Conditioners 155 include active or passive filters or other signal modifying circuits. For example, in some embodiments, Signal Conditioner 155 comprises a frequency dependent filter configured to separate the power signal of Power Line 115 at 50-60 Hz from digitally encoded signals at higher frequencies.

In some embodiments, Signal Conditioners 155 are used to remove noise from the line that is below an operating band. In some embodiments, Signal Conditioners 155 are used to prevent unwanted out of band frequency signals in either the TX and/or RX pathways, such as those generated in the replica spectrum of a sampled system or those generated by some other signal source. For example, Signal Conditioners 155 may be configured to block signals associated with telephonic communication, cable television signals, digital subscriber line (DSL) communication, and/or the like. In some embodiments, Signal Conditioners 155 are configured to perform some protection task, such as current limiting or over-voltage protection. In some embodiments, Signal Conditioners 155 are used to impedance match the input to the output of other components to improve signal transfer and spectral response. In some embodiments, Signal Conditioners 155 are configured to separate signals in a high band from signals in a low band. Signal Conditioners 155 are optionally configured to achieve several of these functions.

Communication Interface 100 optionally further comprises one or more Coupling Capacitors 160 and other Signal Conditioner 155J on the AC mains side of the last Transformer 135. Signal Conditioner 155J can include the Coupling Capacitors 160 or be transposed with Coupling Capacitors 160 in various configurations to safely couple the signals onto the Power Line 115. Signal Conditioner 155J can be passive and/or active, and can provide filtering or protection functions amongst other functions. The final Transformer 135 is optionally configured to be of a voltage rating to provide secondary isolation from the AC mains. One of ordinary skill in the art will understand that there are various alternative configurations that may be used to couple Communication Interface 100 to Power Line 115.

Communication Interface 100 optionally further includes a Transformer 165 that is included in RX Path 145. Transformer 165 may include a winding ratio of one, a winding ratio greater than one, or a winding ratio less than one. The circuit configurations shown here are differential in nature, but it will be easily understood that any section in either or both of the RX or TX paths may be single-ended. Communication Interface 100 optionally includes one or more fuses, not shown.

While the TX Path 140 and the RX Path 145 are shown to separate between Transformer 130 and Signal Conditioner 155B in FIG. 1, these two signal paths may separate at other points within Communication Interface 100 in alternative embodiments. For example, between Line Driver 150 and Signal Conditioner 155A, between Signal Conditioner 155A and Transformer 130, between Signal Conditioner 155B and Transformer 135, between Transformer 135 and Signal Conditioner 155J, or between Signal Conditioner 155J and Coupling Capacitors 160. As shown elsewhere herein the separation point may include a transformer or a signal conditioner.

Figure 2:
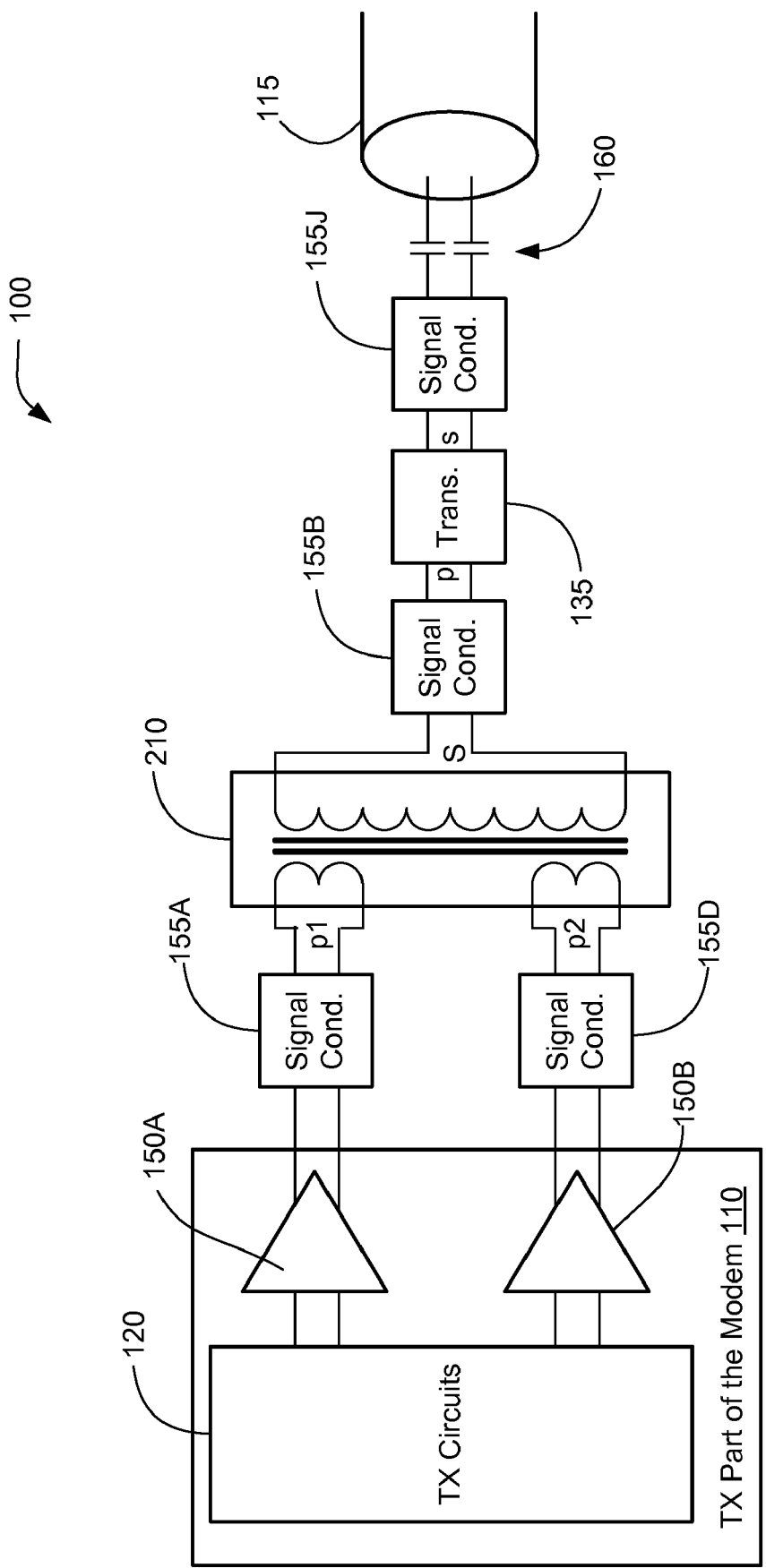
FIG. 2 illustrates a TX Path of a dual-line-driver communication interface comprising two transformers in series, according to various embodiments of the invention.

FIG. 2 illustrates the TX Path 140 of a multiple output single band communication interface implemented with a split TX pathway, comprising two transformers in series, according to various embodiments of the invention. In these embodiments, TX Path 140 includes a Multi-Tap Transformer 210, optional Signal Conditioner 155A, optional Signal Conditioner 155D, and one, two or more optional Line Driver 150, individually labeled 150A ... 150B, etc. Each Line Driver 150 is configured to drive signals responsive to circuitry in the TX Circuits 120. In some embodiments, the signals generated by Line Drivers 150 are similar and result in an additive effect within Multi-Tap Transformer 210, in order to further increase the injected power. These signals transmitted at the same frequency at the same time and to be combined are considered additive signals. In these embodiments, Signal Conditioner 155A and Signal Conditioner 155D are optionally the same. Likewise Line Driver 150A and Line Driver 150B are optionally the same. In other embodiments, the signals generated by Line Drivers 150 are of different frequencies, Signal Conditioners 155A and 155D are configured to condition signals of different frequencies within the same transmission band, and Line Drivers 150A and 150B may or may not be the same. For instance, in some embodiments, Line Driver 150A is configured to drive signals in a first frequency range of a communication band while Line Driver 150B is configured to drive signals in a second frequency range of the same communication band. For example, Line Driver 150A may be configured to drive signals between 2 and 12 MHz while Line Driver 150B is configured to drive signals between 12 and 30 MHz. As both Line Drivers 150A and 150B communicate complementary (e.g., interdependent) signals, the effective signal transmitted is effectively one interdependent signal between 2-30 MHz when the signal exits Multi-tap Transformer 210.

Multi-Tap Transformer 210 may have the same winding ratios between each of the primary coils and the secondary coil, or may have different winding ratios. For example, in some embodiments, one of the primary coils may have an effective winding ratio of 1:2 while the other has an effective winding ratio of 1:2.5. In some embodiments Multi-Tap Transformer 210 includes more than two primary taps and is configured to receive signals from more than 2 Line Drivers 150.

RX Path 145 is not shown in FIG. 2 for clarity, but optionally includes Transformer 135 but not Multi-Tap Transformer 210. RX Path 145 optionally includes an additional multi-tap transformer similar to Multi-Tap Transformer 210.

Figure 3:
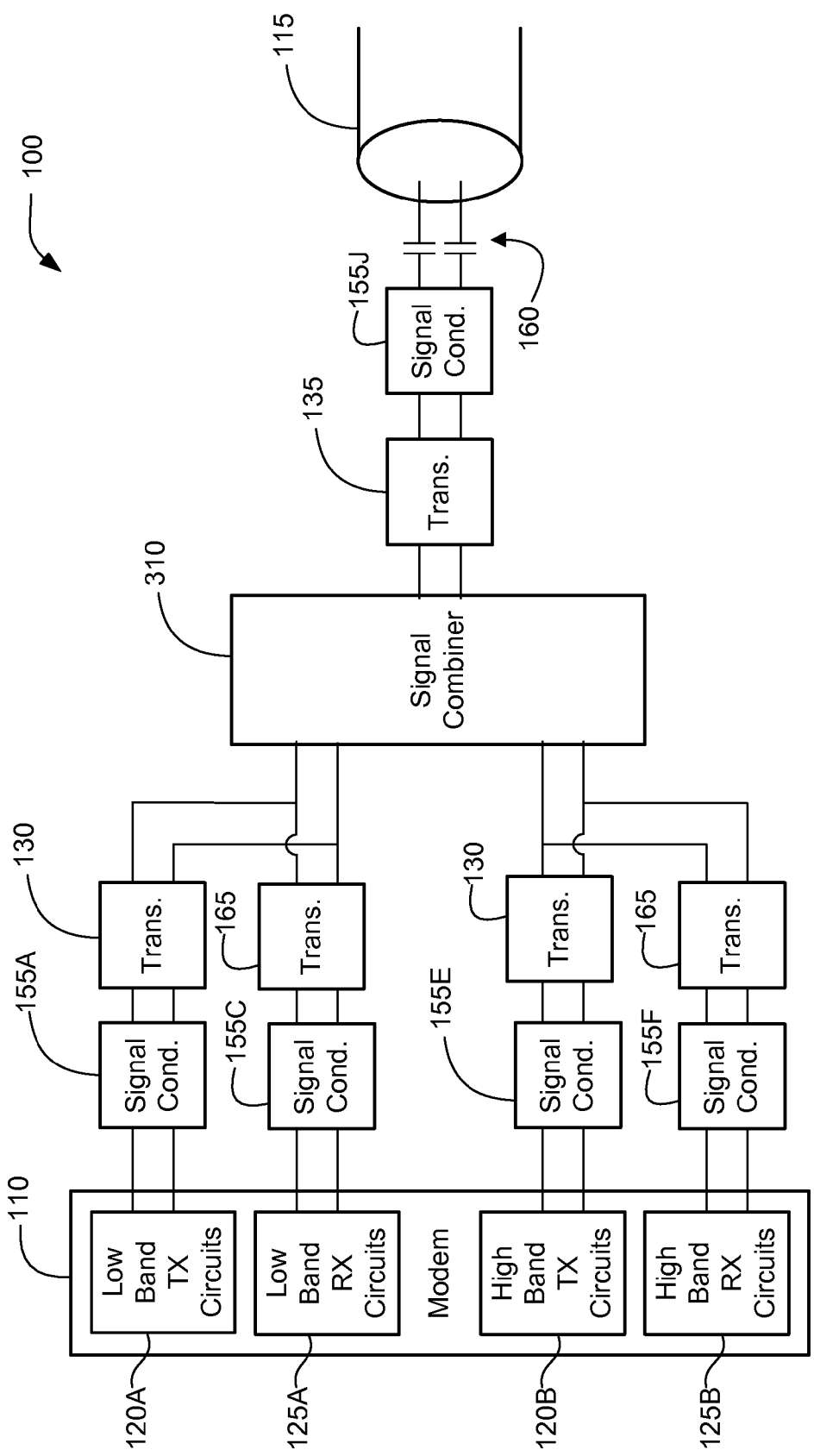
FIG. 3 illustrates alternative embodiments of a communication interface including separate "high" and "low" band channels, according to various embodiments of the invention.

FIG. 3 illustrates alternative embodiments of Communication Interface 100 including separate "high" and "low" band channels in both TX Circuits 120 and RX Circuits 125. The terms high band and low band are used here to indicate the relative frequencies of each band and not their absolute frequency ranges. The high and low band channels may include any of the frequency ranges and combinations taught in the U.S. Patent applications cited herein. Typically each of these bands will include a distinct (although optionally overlapping) set of frequencies. In FIG. 3 Line Drivers 150 are not shown for clarity.

In the embodiments illustrated by FIG. 3, TX Circuits 120 are divided into Low Band TX Circuits 120A and High Band TX Circuits 120B. Low Band TX Circuits 120A are configured to transmit digitally encoded signals in the low band and High Band TX Circuits 120B are configured to transmit digitally encoded signals in the high band. The transmitted signals are optionally passed through a line driver (not shown), Signal Conditioner 155A and/or Transformer 130 before being received by a Signal Combiner 310.

Likewise, RX Circuits 125 are divided into High Band RX Circuits 125B and Low Band RX Circuits 125A, configured to receive digitally encoded signals in the high and low bands respectively. The received signals are optionally received through Signal Conditioner 155C, a Signal Conditioner 155E and/or Transformer 165.

Signal Combiner 310 is configured to combine and separate the high band and low band signals. For example Signal Combiner 310 combines signals transmitted by Low Band TX Circuits 120A and by High Band TX Circuits 120B. Signal Combiner 310 may include, for example, a multiplexer, a multi-tap transformer, a combination of high and low pass filters, a combination of band-pass and notch filters, a diplexer, or the like. In some embodiments Signal Combiner 310 is combined with Transformer 135. Another instance of Signal Conditioner 155 is optionally disposed between Signal Combiner 310 and Transformer 135. Separate instances of Signal Combiner 310 are optionally used for the low band and high band TX and RX signals. Transformers 130 used to transform the low band and high band signals optionally have different characteristics such as winding ratios, frequency profiles, impedance, and/or the like, respectively. Likewise, optional Transformers 165 used to transform the low band and high band signals optionally have different characteristics such as winding ratios, frequency profiles, impedance, and/or the like, respectively.

Figure 4:
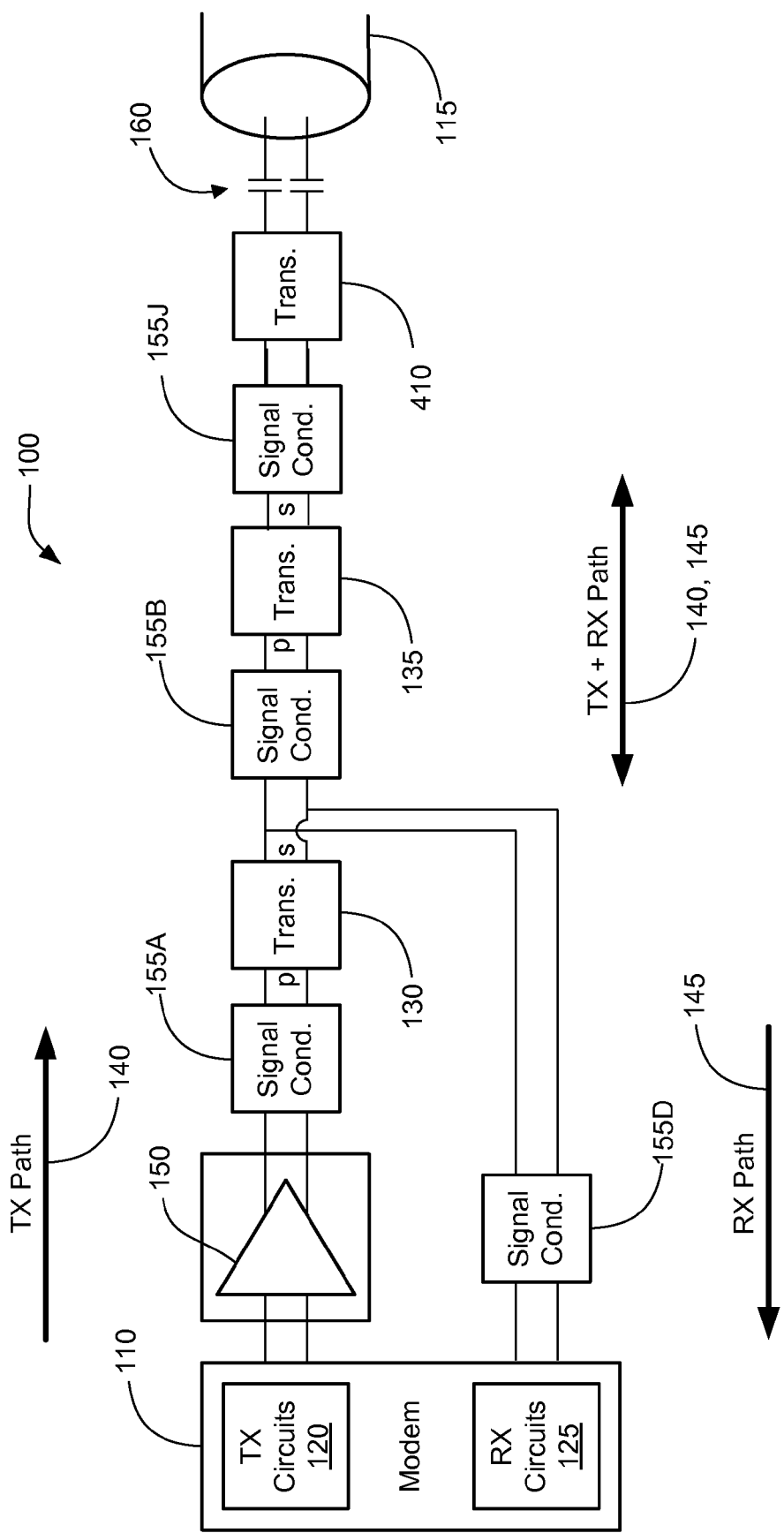
FIG. 4 illustrates alternative embodiments of a communication interface including a separate isolation transformer, according to various embodiments of the invention.

FIG. 4 illustrates alternative embodiments of Communication Interface 100 including a separate Isolation Transformer 410. Isolation Transformer 410 is configured to isolate relatively large voltages found on Power Line 115 from other components of Communication Interface 100. Isolation Transformer 410 may have a winding ratio less than, equal to, or greater than one. Signal Conditioner 155J is optionally disposed between Isolation Transformer 410 and Transformer 135. For example, Signal Conditioner 155J may be configured to block signals around 50-60 Hz and, thus, reduce the magnitude of voltages experienced by Transformer 135. Isolation Transformer 410 is optionally included in the other embodiments of Communication Interface 100 discussed herein.

Figure 5:
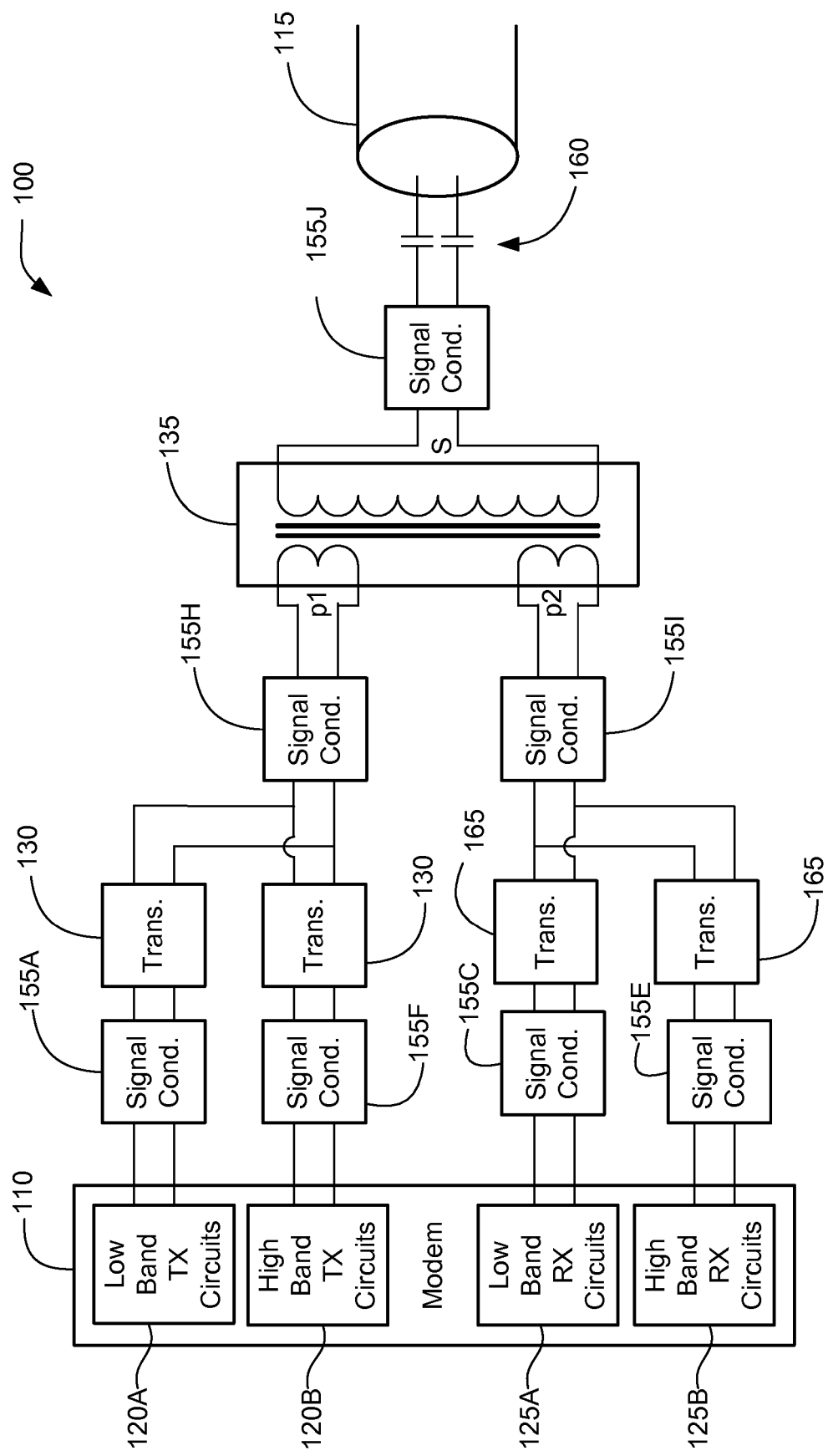
FIG. 5 illustrates alternative embodiments of a communication interface including separate "high" and "low" band channels wherein the channels are combined in a multi-tap transformer, according to various embodiments of the invention.

FIG. 5 illustrates alternative embodiments of Communication Interface 100 wherein Transformer 135 is a multi-tap transformer. In these embodiments, transmitted signals are coupled through a First Primary Winding (P1) and received signals are coupled through a Second Primary Winding (P2). All of these signals are coupled through a Secondary Winding (S). The ratio of P1:S may be greater than, the same as, or less than the ratio P2:S. For example, in some embodiments, P1:S is 1:4 while P2:S is 2:4, approximately. P2:S may be two or more times greater than P1:S. As in the embodiments illustrated by FIG. 3, additional elements, such as Transformer 165, are optional in the embodiments illustrated by FIG. 5.

Using the embodiments of Communication Interface 100 illustrated in FIG. 5 it is possible that a signal generated using Low Band TX Circuits 120A is increased in magnitude by Transformer 130 and the winding ratio P1:S before being coupled into Power Line 115. Likewise, a low band signal received from Power Line 115 may be reduced by the winding ratio P2:S and the optional Transformer 165 before being received at Low Band RX Circuits 125A. Embodiments of Signal Combiner 310 (not shown) are optionally used to combine/separate low and high band signals in the embodiments illustrated by FIG. 5.

FIG. 6 illustrates methods of receiving a digitally encoded signal, according to various embodiments of the invention. These methods are discussed generally in relation to the embodiments of Communication Interface 100 illustrated by FIG. 1. However, it will be apparent to those skilled in the art that the methods illustrated by FIG. 6 can be adapted to other embodiments of Communication Interface 100 illustrated herein. These adaptations will include steps relating to passing signals through one or more of the components illustrated in, for example, FIGS. 2-5.

In a Receive Step 610, a signal including digitally encoded data is received from Power Line 115. This signal may be received from another device as part of a network communication. This other device may include an embodiment of Communication Interface 100. The received signal may include network communication protocols such as telephone exchange, TCP/IP or Ethernet protocols. The data within the digitally encoded signal is optionally contained in packets that conform with IP or Ethernet standards.

In a First Transform Step 620, the digitally encoded signal is transformed to a lower peak-to-peak voltage using Transformer 135.

In an optional Condition Signal Step 630, the received signal is conditioned using Signal Conditioner 155B. For example, Condition Signal Step 630 may include separating signals at the frequency at which power is transmitted through Power Line 115 from signals that include digitally encoded data at different frequencies.

In an optional Second Transform Step 640, the received and optionally conditioned signal is transformed again using Transformer 165. In various embodiments, this transformation results in a signal having a lower peak-to-peak voltage, approximately the same peak-to-peak voltage, or a greater peak-to-peak voltage.

In an optional Condition Signal Step 650, the signal is conditioned using Signal Conditioner 155C. In some embodiments, this conditioning is configured to separate signals in different frequency bands.

In a Receive Step 660, the signal is received by RX Circuits 125. RX Circuits 125 may be used to decode the digitally encoded information within the received signals. For example, RX Circuits may generate digital data representative of the encoded information using an analog to digital converter.

FIG. 7 illustrates methods of transmitting a digitally encoded signal, according to various embodiments of the invention. These methods are discussed generally in relation to the embodiments of Communication Interface 100 illustrated by FIG. 1. However, it will be apparent to those skilled in the art that the methods illustrated by FIG. 7 can be adapted to other embodiments of Communication Interface 100 illustrated herein. These adaptations will include steps relating to passing signals through one or more of the components illustrated in, for example, FIGS. 2-5.

In a Generate Signal Step 710, TX Circuits 120 generate a signal including digitally encoded information. In some embodiments, this information is received from a computing device using Communication Interface 100 to communicate with other devices via Power Line 115. The generated signal may include network communication protocols such as telephone exchange, TCP/IP or Ethernet protocols.

In an optional Drive Step 720, Line Driver 150 is used to provide the signal at an appropriate voltage, current, impedance and/or the like. Drive Step 720 optionally includes amplifying the signal generated by TX Circuits 120.

In an optional Condition Signal Step 730, Signal Conditioner 155A is used to condition the signal from Line Driver 150.

In a First Transform Step 740, the signal is transformed using Transformer 130. This transformation includes increasing the peak-to-peak voltage of the signal.

In an optional Condition Signal Step 750, the signal transformed using Transformer 130 is conditioned using Signal Conditioner 155B.

In a Second Transform Step 760, the signal is transformed for a second time using Transformer 135. This step includes further increasing the peak-to-peak voltage of the signal. Examples of the resulting peak-to-peak voltages are provided elsewhere herein.

In a Couple Step 770, the signal is coupled into Power Line 115 using Coupling Capacitors 160.

The methods illustrated by FIG. 7 are optionally performed in response to receiving a signal using the methods illustrated by FIG. 6. For example, a computing device (not shown) may receive data from Power Line 115 using Communication Interface 100 and in response to this data send different data to another computing device using Communication Interface 100 and Power Line 115. The received and transmitted signals are optionally in different frequency bands. Further, steps of separating or combining signals in different frequency ranges using embodiments of Signal Conditioner 155 and/or Signal Combiner 310 may occur in the embodiments illustrated by FIGS. 6 and 7.

Figure 8:
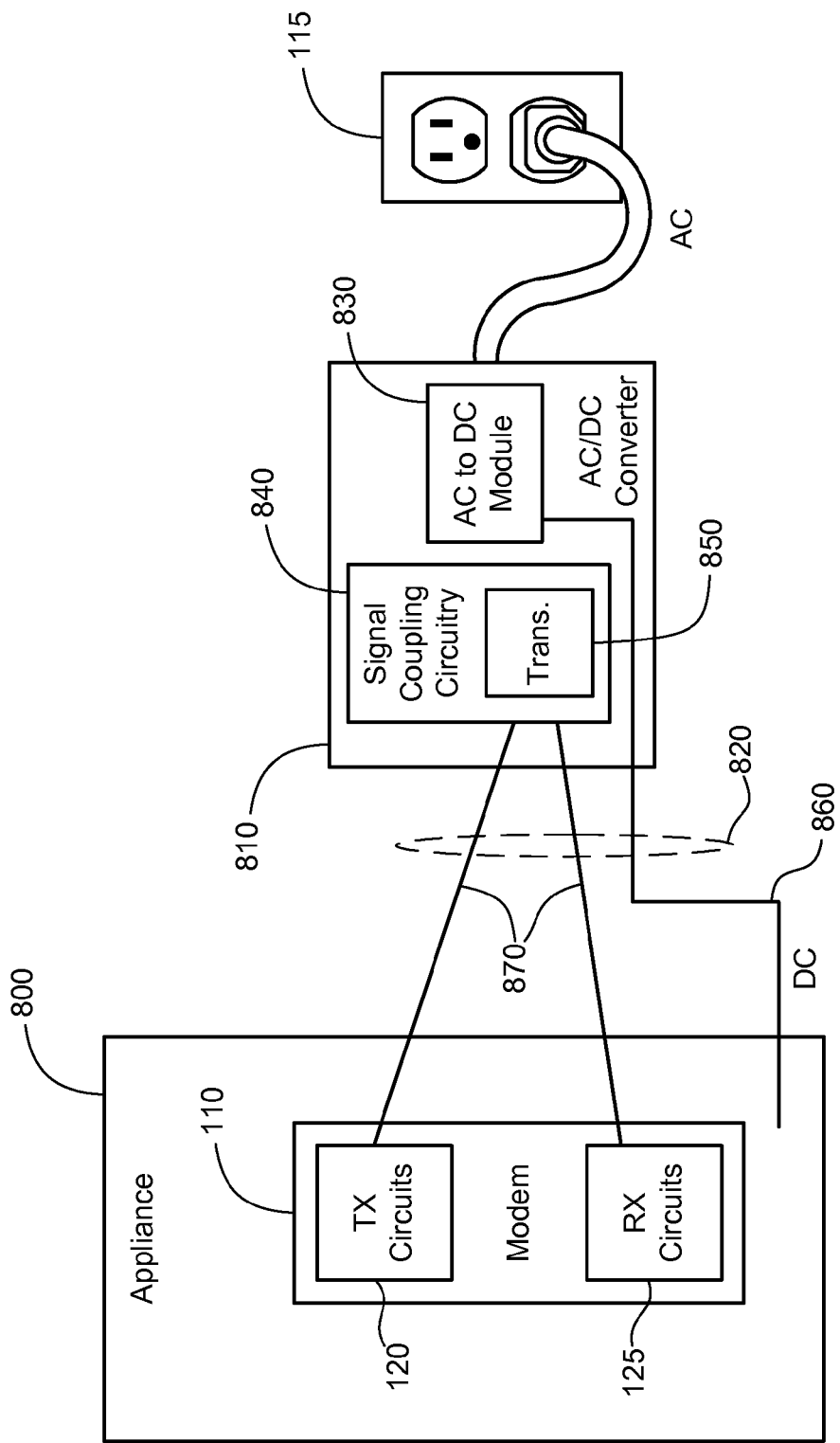
FIG. 8 illustrates an AC/DC converter disposed between an appliance and an AC power outlet, the AC/DC converter including at least part of a communication interface, according to various embodiments of the invention.
Figure 9:
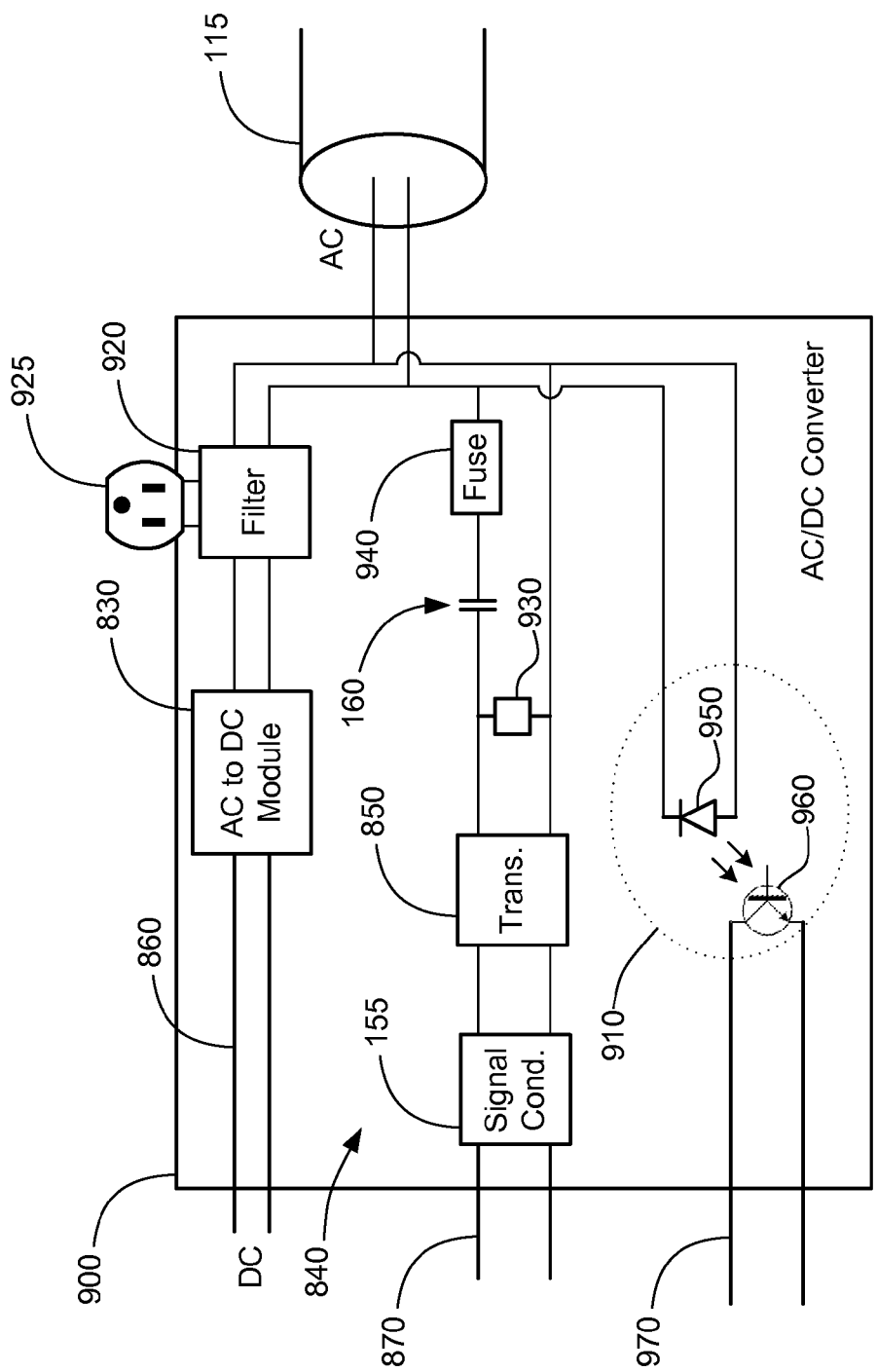
FIG. 9 illustrates another AC/DC converter including at least part of a communication interface, according to various embodiments of the invention.
Figure 10:
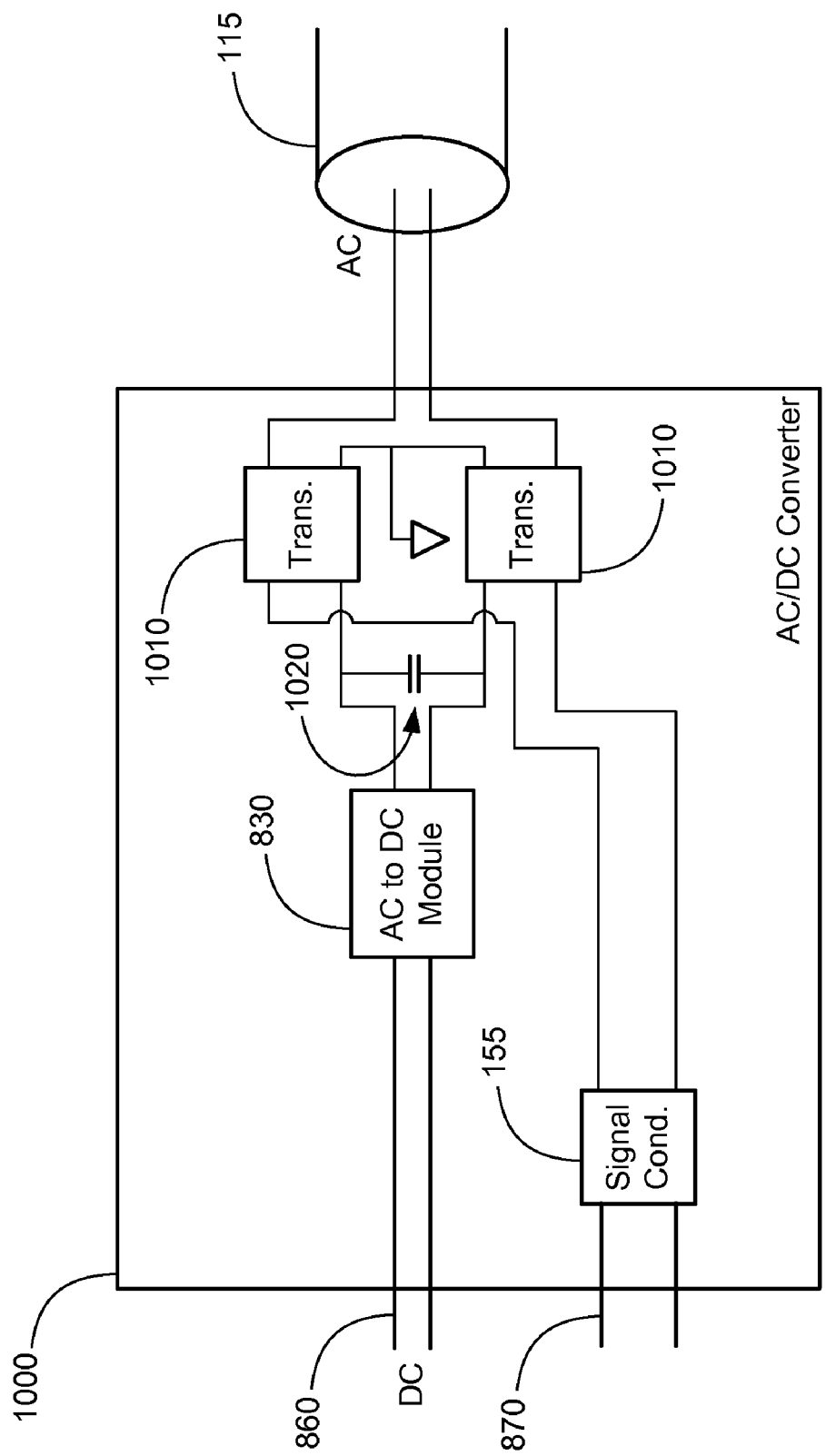
FIG. 10 illustrates still another AC/DC converter including at least part of a communication interface, according to various embodiments of the invention.

While many appliances are configured to operate directly on AC power, many other appliances are configured to operate on DC power supplied from AC power by way of an AC/DC converter. Examples of such appliances include devices that can optionally operate on battery power such as portable electronic devices like laptop computers. FIG. 8 illustrates generally an AC/DC converter for use with such appliances to permit the appliances to send and receive digitally encoded signals through power lines. FIGS. 9 and 10 are directed to different embodiments of the AC/DC converter. It will be appreciated that the present invention is not limited to portable appliances but can also be employed in conjunction those appliances that may benefit from an external AC/DC converter in order to present a smaller form factor and/or to better dissipate heat and/or protect temperature sensitive components. Examples include set top boxes, home gateways, routers, digital media adaptors, network-attached storage (NAS), hard drives, and flat panel displays. Other exemplary portable appliances include cameras, phones, gaming devices, media players, electronic tablets, e-readers, and the like. In some instances the external AC/DC converter is disposed within a docking station or battery charger for the portable or non-portable appliance so that the appliance automatically becomes a node on a network through an Ethernet connection whenever the appliance is connected to a power line by the external AC/DC converter.

FIG. 8 shows an Appliance 800 connected to a Power Line 115 by an AC/DC Converter 810. AC/DC Converter 810 is connected to Appliance 800 by Cabling 820. While AC/DC Converter 810 can, in some embodiments, be integral with Appliance 800, in some embodiments AC/DC Converter 810 is external to, and/or detachable from, Appliance 800. In some of the embodiments in which AC/DC Converter 810 is integral with Appliance 800, AC/DC Converter 810 is internal to Appliance 800. AC/DC Converter 810 typically comprises circuits configured to decouple digitally encoded signals from the AC voltages of a power line and/or configured to inject digitally encoded signals into a power line. Appliance 800 may include, for example, a computing device, telephone, audio device, video device, wireless device, printer, laptop computer, television, stereo, music storage device, audio amplifier, speaker, and/or the like.

In FIG. 8, Appliance 800 includes Power Line Modem 110 configured to send and receive digitally encoded signals. The Power Line Modem 110 in the illustrated embodiment includes TX Circuits 120 for transmitting digitally encoded signals, and RX Circuits 125 for receiving digitally encoded signals, as discussed elsewhere herein. Although not shown in the embodiments illustrated by FIG. 8, Appliance 800 can include at least some of the active and/or passive components of a communication interface such as Communication Interface 100.

AC/DC Converter 810 includes an AC to DC Module 830 configured to convert the AC line voltage of the Power Line 115 to one or more DC voltages (e.g., +/−5V, +/−9V, +/−12V, or the like). AC/DC Converter 810 also includes at least some of the active and/or passive components of a communication interface such as Communication Interface 100. For example, in the illustrated embodiments AC/DC Converter 810 comprises Signal Coupling Circuitry 840 that includes at least a Transformer 850 configured to receive digitally encoded signals from Appliance 800 and to couple the digitally encoded signals into and out of the Power Line 115.

It will be appreciated that Signal Coupling Circuitry 840 can comprise an entire communication interface, or merely a part thereof with the remaining part of the communication interface typically residing in Appliance 800. As one example, and with reference to the embodiments shown in FIG. 1, Signal Coupling Circuitry 840 can comprise Signal Conditioners 155B and 155J, one or more Coupling Capacitors 160, and/or Transformer 135, while the remaining components of Communication Interface 100 reside in Appliance 800. In other embodiments, Signal Coupling Circuitry 840 comprises: elements 160, elements 160 and 155J, elements 160, 155J and 135, elements 160, 155J, 135 and 155B, elements 160, 155J, 135, 155B and 130, elements 160, 155J, 155J, 135, 155B, 130 and 155A, other elements of Communication Interface 100 optionally being disposed in Appliance 800. One or more of elements 155C and 165 may also be included in Signal Coupling Circuitry 840. In some embodiments, Signal Coupling Circuitry 840 comprises one or more of passive elements of Communication Interface 100.

Cabling 820 provides communication between Appliance 800 and AC/DC Converter 810. In those embodiments where AC/DC Converter 810 is detachable from Appliance 800, one side of Cabling 820 can terminate in a DC connector such as a barrel connector or a tip connector for making a connection to a corresponding receptacle on Appliance 800. In some of these embodiments, Cabling 820 is integral with AC/DC Converter 810.

In some embodiments, Cabling 820 comprises one or more Conductors 860 configured to convey the one or more DC voltages between AC/DC Converter 810 and Appliance 800. Cabling 820 can also comprise one or more Conductors 870 configured to convey the digitally encoded signals between Appliance 800 and AC/DC Converter 810. The Conductors 860, 870 are wrapped together by a common insulation layer, in some embodiments, while in other embodiments the one or more Conductors 860 are insulated separately from the one or more Conductors 870. Conductors 870 are optionally rated for the digitally encoded signals but not rated for voltages as high as the AC voltages found on the power line.

FIG. 9 shows an AC/DC Converter 900 that is an example of AC/DC Converter 810 (FIG. 8). AC/DC Converter 900 comprises AC to DC Module 830, Signal Coupling Circuitry 840, and optionally Zero Crossing Circuitry 910. AC/DC Converter 900 may also comprise an optional Filter 920 in electrical communication between AC to DC Module 830 and the Power Line 115, or between AC to DC Module 830 and Signal Coupling Circuitry 840. AC to DC Module 830 receives AC line voltage from Power Line 115 and outputs one or more DC voltages on one or more Conductors 860. The Filter 920 is configured to protect other components of AC/DC Converter 900 from electrical noise generated by AC to DC Module 830. Filter 920 can be a low-pass filter, for example. In some embodiments, Filter 920 can also couple an external AC socket 925 to the Power Line 115. In these embodiments the Filter 920 serves to remove noise generated by any appliances attached to AC socket 925. It will be appreciated that other embodiments of AC/DC Converter 810 (FIG. 8) can optionally also include a Filter 920 and external AC socket 925.

As noted, AC/DC Converter 900 also comprises Signal Coupling Circuitry 840 in electrical communication with Power Line 115 and configured to send and receive digitally encoded signals over one or more Conductors 870. Signal Coupling Circuitry 840 includes the Transformer 850 and can optionally also include one or more of, any combination of, or all of Coupling Capacitor 160, Signal Conditioner 155, an Over-Voltage Protection Device 930, and a Fuse 940. As in the embodiments described with respect to FIG. 8, Signal Coupling Circuitry 840 of the embodiments of FIG. 9 may comprise an entire communication interface, or merely a part thereof with the remaining part of the communication interface optionally residing in an Appliance 800 (not shown in FIG. 9).

In various embodiments, AC/DC Converter 900 also comprises Zero Crossing Circuitry 910 that includes, in the embodiment shown in FIG. 9, a LED (light-emitting diode) 950 and an adjacent Photodetector 960. In the Zero Crossing Circuitry 910, the LED 950 is in electrical communication with Power Line 115 and is configured to emit light pulses that are synchronized to the waveform of the AC line voltage. Photodetector 960 receives the light pulses and produces a timing signal that can be communicated over one or more Conductors 970 to Appliance 800.

Together, the Conductors 860, 870, and optionally 970 can comprise Cabling 820 (FIG. 8). Cabling 820 can be integral with, or detachable from, AC/DC Converter 900, in various embodiments. Where Cabling 820 is detachable from AC/DC Converter 900, AC/DC Converter 900 comprises one or more electrical connectors configured to couple with cabling 820 and convey the various voltages and signals to Appliance 800. Cabling 820, in some embodiments, can also terminate in a DC connector configured to mate with a corresponding receptacle on an Appliance 800 (not shown).

FIG. 10 shows an AC/DC Converter 1000 that is another example of AC/DC Converter 810 (FIG. 8). The AC/DC Converter 1000 comprises AC to DC Module 830, Signal Coupling Circuitry 840, and optionally Zero Crossing Circuitry 910 (not shown). Signal Coupling Circuitry 840 is configured to send and receive digitally encoded signals between one or more Conductors 870 and the Power Line 115. Signal Coupling Circuitry 840, in the illustrated embodiment, comprises a pair of Transformers 1010 in parallel electrical communication between the Power Line 115 and a common ground as shown. In some embodiments the pair of Transformers 1010 is replaced by a single multi-tap transformer. The pair of Transformers 1010 may serve the functions of Transformer 850. Signal Coupling Circuitry 840 optionally also comprise one or more of, any combination of, or all of a Signal Conditioner 155, a Coupling Capacitor 160 (not shown), an Over-Voltage Protection Device 930 (not shown), and a Fuse 930 (not shown). As in the embodiments described with respect to FIGS. 8 and 9, Signal Coupling Circuitry 840 of the embodiment of FIG. 10 may comprise an entire communication interface, or merely a part thereof with the remaining part of the communication interface optionally residing in an Appliance 800 (not shown in FIG. 10).

AC to DC Module 830 of the embodiment illustrated by FIG. 10 receives AC line voltage from Power Line 115 through the pair of Transformers 1010, as shown, and outputs one or more DC voltages on one or more Conductors 860. In some embodiments, a filter such as Capacitor 1020 is disposed between the pair of Transformers 1010 and AC to DC Module 830 to protect other components of AC/DC Converter 1000 from electrical noise generated by AC to DC Module 830.

Conductors 860 and 870, and optionally 970 (not shown), together can comprise Cabling 820 (FIG. 8). Cabling 820 can be integral with, or detachable from, AC/DC Converter 1000, in various embodiments. Cabling 820, in some embodiments, can also terminate in a DC connector configured to mate with a corresponding receptacle on an Appliance 800 (not shown).

FIGS. 9 and 10 illustrate circuits configured to couple digitally encoded signals to and from a power line. Alternative embodiments may include other circuits configured to decouple a digitally encoded signal from a power line and/or to inject a digitally encoded signal into a power line. Examples of such circuits include those illustrated in U.S. patent application Ser. No. 11/467,141 filed Aug. 24, 2006.

Figure 11:
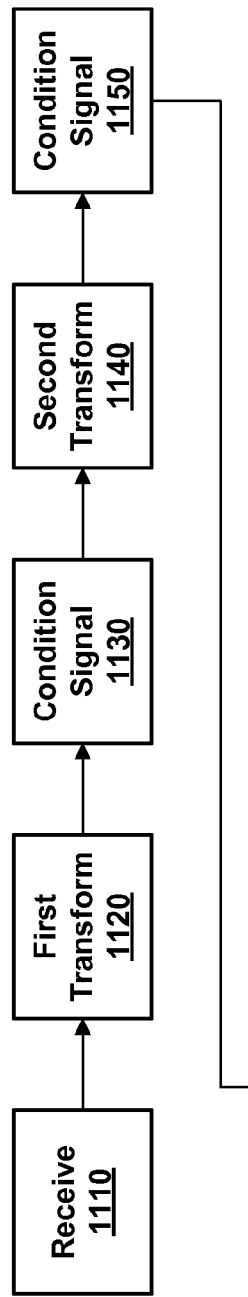
FIG. 11 illustrates methods of receiving a signal, according to various embodiments of the invention.

FIG. 11 illustrates methods of receiving a digitally encoded signal through an AC/DC converter, according to various embodiments of the invention. These methods are discussed generally in relation to the embodiments illustrated by FIGS. 1, 8-10, however, it will be apparent to those skilled in the art that the methods illustrated by FIG. 11 can be adapted to include steps related to the other embodiments illustrated herein.

In a Receive Step 1110, a digitally encoded signal is received from Power Line 115 by Signal Coupling Circuitry 840 of AC/DC Converter 810. The digitally encoded signal may be received from another device as part of a network communication, for example. The received digitally encoded signal may include, for instance, network communication protocols such as telephone exchange, TCP/IP, Ethernet protocols, or the like.

In a First Transform Step 1120, the digitally encoded signal is passed through a transformer such as, for example, Transformer 135. The digitally encoded signal may be transformed to a lower peak-to-peak voltage, a higher peak-to-peak voltage, or the same peak-to-peak voltage. For example, the digitally encoded signal may be transformed to a lower peak-to-peak voltage using the Transformer 850 of Signal Coupling Circuitry 840. First Transform Step 1120 optionally occurs within AC/DC Converter 810.

In a Condition Signal Step 1130, the digitally encoded signal is conditioned using, for example, Signal Conditioners 155J and/or 155B. Condition Signal Step 1130 may occur before and/or after First Transform Step 1120. First Transform Step 1120 and/or Condition Signal Step 1130 typically include separating signals at the frequency at which power is transmitted through Power Line 115 from signals that include digitally encoded data at different frequencies. Such conditioning may be performed using Signal Coupling Circuitry 840. For example, these steps can include decoupling the digitally encoded signal from an AC voltage of the power line, within the AC/DC converter using Signal Coupling Circuitry 840. Alternately, the conditioning can be performed by a Signal Conditioner 155 of Appliance 800.

In an optional Second Transform Step 1140, the received and optionally conditioned digitally encoded signal is passed through a second transformer, such as Transformer 130 or 165. In various embodiments, this transformation results in a signal having a lower peak-to-peak voltage, approximately the same peak-to-peak voltage, or a greater peak-to-peak voltage. While in some embodiments this second transformation is performed by a transformer of Signal Coupling Circuitry 840, in other embodiments this second transformation is performed by a transformer of Appliance 800.

In an optional Condition Signal Step 1150, the digitally encoded signal is conditioned before or after the optional Second Transform Step 1140. In some embodiments, this conditioning is configured to separate signals in different frequency bands. As in Step 1130, such conditioning can be performed by a Signal Conditioner 155 of Signal Coupling Circuitry 840, for example. Alternately, the conditioning can be performed by a Signal Conditioner 155 of Appliance 800.

In a Communicate Step 1160 the digitally encoded signals are communicated to Appliance 800 from AC/DC Converter 810 using Conductors 870. Communicate Step 1160 may occur between First Transform Step 1120 and Condition Signal Step 1130, between Condition Signal Step 1130 and Second Transform Step 1140, and/or between Second Transform Step 1140 and Condition Signal Step 1150.

In a Receive Step 1170, the digitally encoded signal is received by RX Circuits 125 such as those of Modem 110 of Appliance 800. RX Circuits 125 may be used to decode the digitally encoded information within the received signals. For example, RX Circuits 125 may generate digital data representative of the encoded information using an analog to digital converter.

Figure 12:
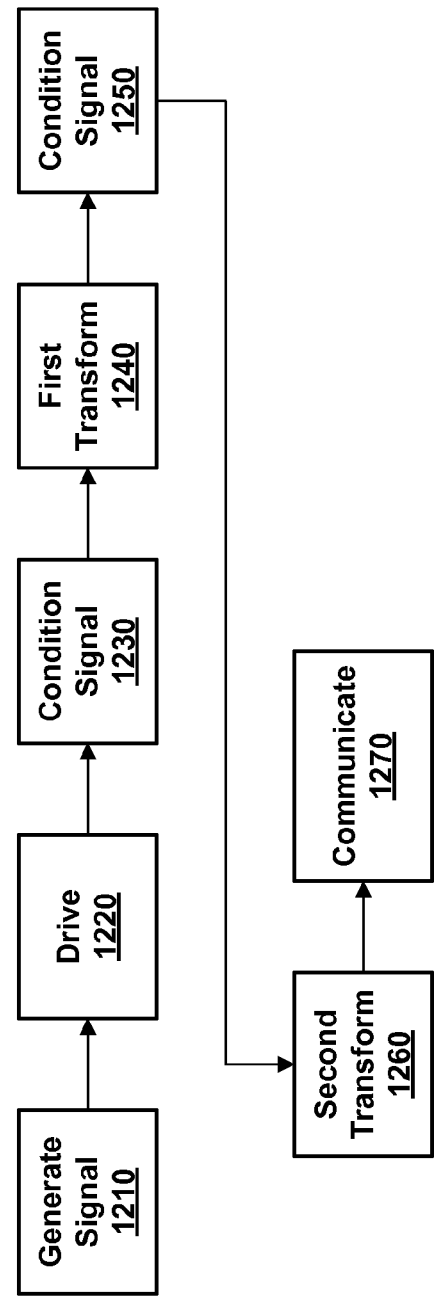
FIG. 12 illustrates methods of transmitting a signal according to various embodiments of the invention.

FIG. 12 illustrates methods of transmitting a digitally encoded signal through an AC/DC converter, according to various embodiments of the invention. These methods are also discussed generally in relation to the embodiments illustrated by FIGS. 1, 8-10, however, the methods illustrated by FIG. 12 can be adapted to include steps related to the other embodiments illustrated herein.

In a Generate Signal Step 1210, TX Circuits 120 are used to generate a digitally encoded signal including digitally encoded information, for example, by a Modem 110 of Appliance 800. In some embodiments, Appliance 800 employs an embodiment of Communication Interface 100 to communicate with other devices via Power Line 115. The generated digitally encoded signal may include network communication protocols such as telephone exchange, TCP/IP, Ethernet protocols, or the like.

In an optional Drive Step 1220, Line Driver 150 is used to provide the digitally encoded signal at an appropriate voltage, current, impedance, and/or the like. Drive Step 1220 optionally includes amplifying the digitally encoded signal generated by TX Circuits 120. In an optional Condition Signal Step 1230, Signal Conditioner 155A is used to condition the digitally encoded signal from Line Driver 150.

In a First Transform Step 1240, the digitally encoded signal is passed through a transformer, such as Transformer 130. This transformation optionally includes increasing the peak-to-peak voltage of the digitally encoded signal. In some embodiments, each of the Steps 1220-1240 are performed by Appliance 800, while in some other embodiments each of the Steps 1220-1240 are performed by AC/DC Converter 810 in electrical communication with the Appliance. In still other embodiments, the Step 1220 is performed by Appliance 800 and the Steps 1230 and 1240 are performed by AC/DC Converter 810, or the Steps 1220 and 1230 are performed by Appliance 800 and the Step 1240 is performed by AC/DC Converter 810.

In an optional Condition Signal Step 1250, the digitally encoded signal is conditioned using, for example, Signal Conditioner 155A of Appliance 800 or a Signal Conditioner 155 of AC/DC Converter 900. In a Second Transform Step 1260, the digitally encoded signal is passed through Transformer 850 of AC/DC Converter 810. This step optionally includes further increasing the peak-to-peak voltage of the digitally encoded signal. Examples of the resulting peak-to-peak voltages are provided elsewhere herein. Steps 1230-1260 may be performed in various alternative orders. Steps 1250 and/or 1260 include coupling the digitally encoded signal into Power Line 115 from AC/DC Converter 810 optionally using, for example, one or more Coupling Capacitors 160 (see FIG. 9), an isolation transformer, or the like. The digitally encoded signal can also be coupled into Power Line 115 from the AC/DC Converter 1000 using, for example, a pair of Transformers 1010.

In a Communicate Step 1270 the digitally encoded signal is communicated from Appliance 800 to AC/DC Converter 810 using Conductors 870. Communicate Step 1270 may occur between Steps 1120 and 1230, between Steps 1230 and 1240, between Steps 1240 and 1250, between Steps 1250 and 1260, or the like.

Several embodiments are specifically illustrated and/or described herein. However, it will be appreciated that modifications and variations are covered by the above teachings and within the scope of the appended claims without departing from the spirit and intended scope thereof. For example, while communication through power lines has been discussed herein for the purposes of example, the invention may be adapted for communication through telephone lines, and cable systems as disclosed in the U.S. Patent Applications cited herein. Communication Interface 100 may be adapted for communication through these media or any combination of telephone lines, cable systems, and/or power lines. Further, the examples provided herein may include additional circuits components configured for shielding, electric discharge protection, performing logic operations, supplying power, making physical connections to communication media, and/or the like. AC/DC Converter 810 may further include circuits configured to turn on or off AC to DC Module 830 responsive to power needs of Appliance 800. These needs are optionally communicated through Conductors 820 or 870.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

The invention claimed is:

1. An apparatus comprising:
a line driver coupled to receive an output from a transmit circuit as an input to the line driver;
a first signal conditioner coupled to receive an output from the line driver as an input to the first signal conditioner;
a first transformer coupled to receive an output from the first signal conditioner on a first winding side of the first transformer;
a second signal conditioner coupled to a second winding side of the first transformer;

a second transformer having a first winding side of the second transformer coupled to the second signal conditioner;

a third signal conditioner coupled between a second winding side of the second transformer and an AC power line;

a third transformer having a first winding side of the third transformer coupled to a transmit path; and a fourth signal conditioner coupled to receive an input from a second winding side of the third transformer and to couple an output from the fourth signal conditioner to a receive circuit, wherein the transmit path for a transmit signal from the transmit circuit to the AC power line is via the line driver, first signal conditioner, first transformer, second signal conditioner, second transformer and the third signal conditioner and wherein a receive path for a receive signal from the AC power line to the receive circuit is via a portion of the transmit path, the third transformer and the fourth signal conditional, in which the transformers provide coupling and the signal conditioners provide signal conditioning.

2. The apparatus of claim 1, wherein the first winding side of the third transformer couples to the transmit path between the second winding side of the first transformer and the second signal conditioner, wherein the receive path from the AC power line to the receive circuit is via the third signal conditioner, second transformer, second signal conditioner, third transformer and the fourth signal conditioner.

3. The apparatus of claim 1 further including coupling capacitors to couple the third signal conditioner to the AC power line.

4. The apparatus of claim 1, wherein all of the coupling between the line driver, signal conditioners and the transformers are direct connections.

5. The apparatus of claim 1, further including the transmit circuit and the receive circuit as part of the apparatus.

6. The apparatus of claim 5, wherein the transmit circuit and the receive circuit send and receive digitally encoded signals.

7. The apparatus of claim 6, wherein the apparatus operates as a modem.

8. The apparatus of claim 6, wherein the apparatus is a portable electronic device.

9. An apparatus comprising:
a line driver coupled to receive an output from the transmit circuit as an input to the line driver;
a first signal conditioner coupled to receive an output from the line driver as an input to the first signal conditioner;
a first transformer coupled to receive an output from the first signal conditioner on a first winding side of the first transformer;
a second signal conditioner coupled to a second winding side of the first transformer;
a second transformer having a first winding side of the second transformer coupled to the second signal conditioner;
a third signal conditioner coupled to a second winding side of the second transformer;
a third transformer having a first winding side of the third transformer coupled to the third signal conditioner and a second winding side of the third transformer coupled to the AC power line; and
a fourth signal conditioner coupled to a transmit path to receive a receive input and to couple an output from the fourth signal conditioner to a receive circuit, wherein the transmit path for a transmit signal from the transmit circuit to the AC power line is via the line driver, first signal conditioner, first transformer, second signal conditioner, second transformer, third signal conditioner and third transformer and wherein the receive path from the AC power line to the receive circuit is via a portion of the transmit path and the fourth signal conditional, in which the transformers provide coupling and the signal conditioners provide signal conditioning.

10. The apparatus of claim 9, wherein the fourth signal conditioner couples to the transmit path between the second winding side of the first transformer and the second signal conditioner, wherein the receive path from the AC power line to the receive circuit is via the third transformer, third signal conditioner, second transformer, second signal conditioner and the fourth signal conditioner.

11. The apparatus of claim 9 further including coupling capacitors to couple the second winding side of the third transformer to the AC power line.

12. The apparatus of claim 9 wherein all of the coupling between the line driver, signal conditioners and the transformers are direct connections.

13. The apparatus of claim 9, further including the transmit circuit and the receive circuit as part of the apparatus.

14. The apparatus of claim 13, wherein the transmit circuit and the receive circuit send and receive digitally encoded signals.

15. The apparatus of claim 14, wherein the apparatus operates as a modem.

16. The apparatus of claim 14, wherein the apparatus is a portable electronic device.

* * * * *